United States Patent [19]
Lejeune

[11] 3,830,277
[45] Aug. 20, 1974

[54] VALVE

[75] Inventor: Daniel Lejeune, Clermont-Ferrand, France

[73] Assignee: Compagnie Generale Des Etablissements Michelin raison sociale Michelin & Cie, Clermont-Ferrand, France

[22] Filed: Jan. 23, 1973

[21] Appl. No.: 326,044

[30] Foreign Application Priority Data
Feb. 1, 1972    France .................................. 72.3560

[52] U.S. Cl. ................................................ 152/427
[51] Int. Cl. ............................................ B60c 29/00
[58] Field of Search ............................. 152/427, 428

[56] References Cited
UNITED STATES PATENTS
2,862,539   12/1958   Williams ............................. 152/427
2,995,168   8/1961    McCord .............................. 152/427

*Primary Examiner*—James B. Marbert
*Attorney, Agent, or Firm*—Brumbaugh, Graves, Donohue & Raymond

[57] ABSTRACT

A valve for a tubeless tire comprises a rigid inner tube and an outer bushing of rubber. The rubber bushing is formed with an annular groove whereby the valve can be fastened in an aperture in a tire rim and a head which when the valve and a tire are mounted on the rim is positioned within the tire air chamber. The tube and bushing are configured with respect to each other in such a manner as to be normally spaced apart from each other adjacent to the annular groove, and the tube is formed with an extension penetrating into the head. The bushing has an inside diameter which is smaller at the head than at the annular groove. This construction prevents flexing and eventual destruction of the valve due to centrifugal force during high-speed travel.

2 Claims, 2 Drawing Figures

PATENTED AUG 20 1974        3,830,277

VALVE

BACKGROUND OF THE INVENTION

This invention relates to valves and, more particularly, to a novel and highly-effective valve for insertion in a wheel rim on which a tubeless tire is mounted, especially in the case of automobiles and other relatively light automotive vehicles.

Conventionally these valves comprise two elements connected together: a rigid tube, generally of brass, and, bonded all around it, a flexible bushing of rubber. The inner tube contains the valve proper, which permits the tire-inflation air to pass through or which retains it in the tire, as may be required. The outer bushing has a special shape that ensures the tight fastening of the assembly on the wheel rim. It comprises an annular groove that forms a constriction between a tapered frustoconical portion and a wide, thick head.

Such valves have a serious drawback; The valve when in place is practically parallel to the axis of the rim, forming an angle of about 10° to 25° with the latter, since the valve is fastened on the portion of the rim connecting the rim base to one of the bead seats. When the vehicle moves at high speed, the portion of the valve that emerges from the rim has a tendency, because of its inertia, or under the influence of what is often called centrifugal force, to bend and to come against the outer face of the bead seat. The flexing movement of the emergent portion of the valve takes place upon each acceleration; it is greater or less depending on the speed reached and in the long run produces a cracking of the bushing at the location of the annular groove by shearing between the end of the valve tube and the wheel rim, both of which are metallic. This results in losses of air, particularly at high speed, when the cracks tend to open up, and especially through the portion of the bushing which is placed in tension and stretched.

SUMMARY OF THE INVENTION

An object of the invention is to remedy the shortcomings of conventional valves outlined above and to provide a valve that performs all the useful functions of prior valves, that is easily installed and fastened in an airtight manner, that is not damaged by movements due to centrifugal force, and that can be manufactured with the same tools as those used in the manufacture of prior valves.

The foregoing and other objects are attained in accordance with the invention by the provision of a valve comprising a rigid inner tube and an outer bushing of rubber, the outer bushing being provided with an annular groove to permit fastening to a rim, the tube being spaced apart from the lining at the level of the annular groove. The valve is charcterized by an extension of the rigid tube beyond the annular groove and into the head of the bushing and by a reduction of the inner diameter of the bushing at the head of the bushing as compared with its inner diameter at the annular groove.

These features substantially immobilize the tube in the valve hole, since the head of the bushing participates in the holding of the tube in place because of a radial clamping of the tube by the head of the bushing.

The valve is preferably characterized by a number of additional features:

a. The tube extends to the base of the head of the bushing. That is, the tube extension terminates at the end of the bushing. It is advisable for the tube to be extended as much as possible, without, however, protruding beyond the bushing, which could form a roughness which might injure the tire during mounting of the tire on the rim.

b. The outside diameter of the tube is reduced in the portion contained within the head of the bushing as compared with its diameter adjacent the annular groove. This facilitates the mounting of the valve by increasing the space for radial contraction of the bushing during the mounting. It also facilitates the manufacture by facilitating the molding and removal from the mold of the bushing.

BRIEF DESCRIPTION OF THE DRAWING

A better understanding of the invention can be gained from a consideration of the following detailed description of the preferred embodiments thereof in conjunction with the appended figures of the drawing, wherein.

DESCRIPTION OF THE PREFERRED EMBODIMENTS

Figure 1:
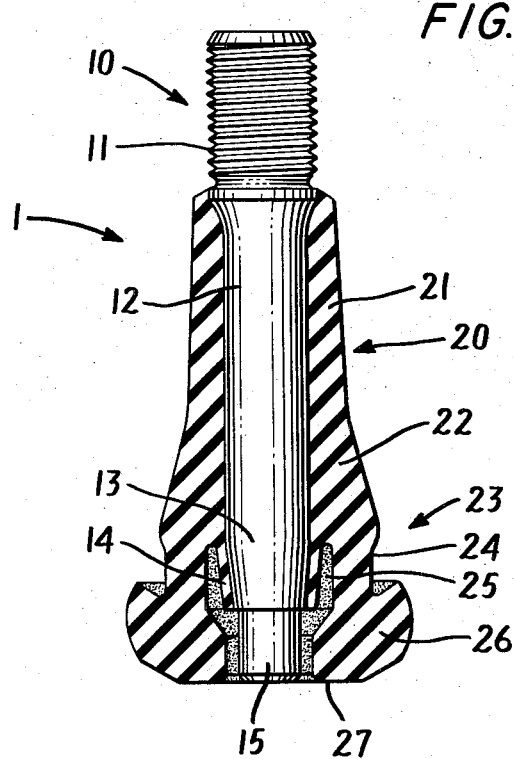
FIG. 1 is an elevational view, partly in section, of a valve in accordance with the invention, the section plane containing the valve axis.

The figures show the two major elements of the valve 1, namely the inner brass tube 10 and the outer rubber bushing 20.

The tube 10 comprises a first threaded portion 11 emerging from the bushing 20 and intended to receive a cap (not shown); a second part 12 permanently bonded to the bushing 20 and containing the valve proper (not shown); a third portion 13, which is slightly frustoconical, covered by a layer of rubber 14, and normally spaced apart from the bushing; and a fourth, cylindrical, portion 15, which is not covered by rubber, is of reduced diameter, and is spaced apart from te bushing.

The bushing 20 is formed with a first frustoconical portion 21, having a slight taper; a second frustoconical portion 22, having a much more pronounced taper; a constricted portion 23, delimited on the outside by an annular groove 24 and on the inside by an annular cavity 25; and a head 26 having a base 27.

The portions 21 and 22 of the bushing are adjacent to the portion 12 of the tube; the constricted portion 23 is adjacent to the rubber-covered portion 13 of the tube; and the head 26 of the bushing is adjacent to the extension 15 of the tube.

The head 26 has an inside diameter which is substantially smaller than the inside diameter of the constricted portion 23. When the valve and a tire are mounted in an aperture in the rim 2, the head 26 is positioned within the tire air chamber.

Figure 2:
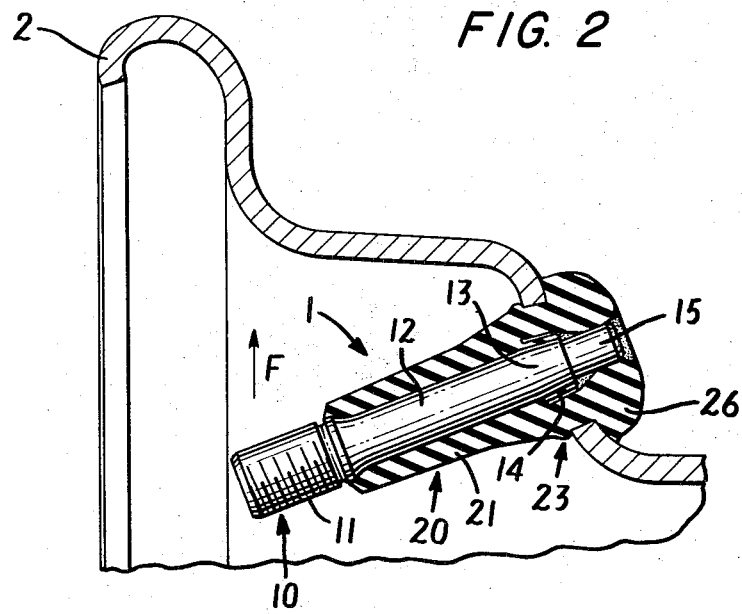
FIG. 2 is an elevational view, partly in section, of the same valve installed on a rim, the section plane containing the valve axis.

As FIG. 2 shows, when the valve is fastened on the rim 2, not only is the constricted portion 23 of the bushing pressed between the rim 2 and the portion 13 of the tube, but furthermore the head 26 of the bushing compresses the extension 15 of the tube and resists pivoting of the tube under the action of the centrifugal force indicated by the arrow F. When the valve is mounted on the rim, the bushing is subjected to an axial elongation, so that the corresponding end of the tube is somewhat recessed within the head 26 of the bushing.

The invention is not limited to the example described; it is possible, without going beyond the scope of the invention, to make various additions or modifications in it. In particular, it is not necessary that the opposed surfaces of the tube and of the bushing be cylindrical, especially in the portion of the valve remaining on the inside of the rim. Furthermore, the connection of the head of the bushing with the end of the tube can be made stronger by providing on the end of the tube, for instance by means of a thread, a sleeve which has at its end a flange intended to rest against the axial face of the head of the bushing.

Accordingly, the invention is to be construed as covering all embodiments thereof within the scope of the appended claims.

I claim:

1. A valve for a tubeless tire comprising a rigid inner tube and an outer bushing of rubber, said bushing being formed with an annular groove whereby the valve can be fastened in an aperture in a tire rim and a head which when the valve and a tire are mounted on the rim is positioned within the tire air chamber, said tube and bushing being configured with respect to each other in such a manner as to be normally spaced apart from each other adjacent to said annular groove, said tube being formed with an extension penetrating into said head and terminating substantially at the end of said bushing, and said bushing having an inside diameter which is smaller at said head than at said annular groove.

2. A valve according to claim 1 wherein the portion of said tube penetrating into said head has an outside diameter smaller than that of the portion of the tube adjacent to said annular groove.

* * * * *